(12) United States Patent
Clements et al.

(10) Patent No.: US 6,440,188 B1
(45) Date of Patent: Aug. 27, 2002

(54) AIR FILTER ASSEMBLY CAPABLE OF TOP AND BOTTOM LOADING

(75) Inventors: Jack T. Clements, Lee's Summit, MO (US); Reinout G. Oussoren, Wiedlisbach (CH)

(73) Assignee: BHA Group, Holdings, Inc., Kansas City, MO (US)

(*) Notice: Subject to any disclaimer, the term of this patent is extended or adjusted under 35 U.S.C. 154(b) by 0 days.

(21) Appl. No.: 09/707,527

(22) Filed: Nov. 7, 2000

Related U.S. Application Data
(60) Provisional application No. 60/216,717, filed on Jul. 7, 2000.

(51) Int. Cl.[7] .............................................. B01D 46/02
(52) U.S. Cl. ........................ 55/378; 55/379; 55/341.1; 55/502; 55/DIG. 26
(58) Field of Search .......................... 55/374, 376, 377, 55/378, 379, 490, 492, 498, 502, 507, 508, 509, DIG. 26, 341.1; 81/3.07, 3.09, 3.48, 3.49, 438, 488

(56) References Cited

U.S. PATENT DOCUMENTS

| | | | | |
|---|---|---|---|---|
| 2,083,914 A | * | 6/1937 | Leathers | ...................... 55/378 |
| 2,503,568 A | | 4/1950 | Timm | |
| 3,876,402 A | * | 4/1975 | Bundy et al. | .................. 55/379 |
| 3,942,962 A | | 3/1976 | Duyckinck | |
| 3,997,305 A | | 12/1976 | Ulvestad et al. | |
| 4,073,632 A | | 2/1978 | Reinauer et al. | |
| 4,204,960 A | * | 5/1980 | Sugiyama et al. | ............. 55/507 |
| 4,218,227 A | | 8/1980 | Frey | |
| 4,256,473 A | * | 3/1981 | DeMartino | .................... 55/379 |
| 4,276,069 A | * | 6/1981 | Miller | .......................... 55/379 |
| 4,291,904 A | | 9/1981 | Iversen et al. | |
| 4,344,781 A | | 8/1982 | Higgins et al. | |
| 4,407,664 A | * | 10/1983 | Sillers et al. | .................. 55/498 |
| 4,436,536 A | | 3/1984 | Robinson | |
| 4,443,237 A | | 4/1984 | Ulvestad | |
| 4,769,052 A | * | 9/1988 | Kowalski | ...................... 55/379 |
| 5,061,303 A | * | 10/1991 | Williams et al. | ............... 55/379 |
| 5,222,488 A | | 6/1993 | Forsgren | |
| 5,247,727 A | * | 9/1993 | Harris et al. | .................... 29/259 |
| 5,290,441 A | | 3/1994 | Griffin et al. | |
| 5,336,405 A | | 8/1994 | Tang et al. | |
| 5,536,290 A | * | 7/1996 | Stark et al. | .................... 55/498 |
| 6,082,230 A | * | 7/2000 | Steinweg | .................. 81/176.15 |
| 6,244,720 B1 | * | 6/2001 | Neff | ............................ 362/96 |

FOREIGN PATENT DOCUMENTS

| | | | |
|---|---|---|---|
| GB | | 2195558 | 4/1988 |
| GB | | 2 195 558 A | * 4/1988 |

* cited by examiner

Primary Examiner—Duane Smith
Assistant Examiner—Jason M. Greene
(74) Attorney, Agent, or Firm—Shook Hardy & Bacon

(57) ABSTRACT

A baghouse filter having a filter media and an end cap is provided. The filter media has a longitudinal axis, and the end cap has an outer peripheral side wall. The side wall has first and second edges. A first recessed channel extends between the first and second edges of the side wall, and a second recessed channel extends from the first channel. The first and second channels define a connection area at which the filter connects to the tubesheet at an opening in the tubesheet. Also, a method is provided for installing a filter on a tubesheet having first and second sides separating plenums of a baghouse. The method includes providing a filter having structure for attaching to a tubesheet opening from either side, selecting the side to install the filter and installing the filter on the selected side.

14 Claims, 4 Drawing Sheets

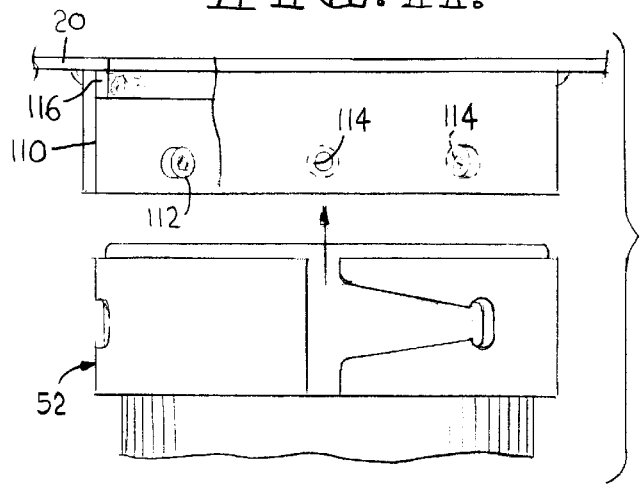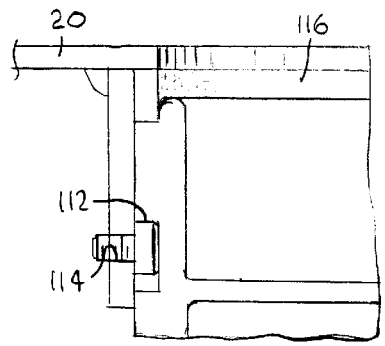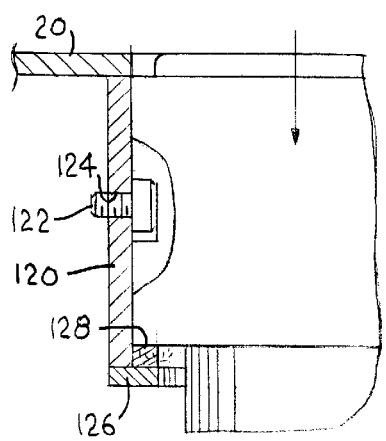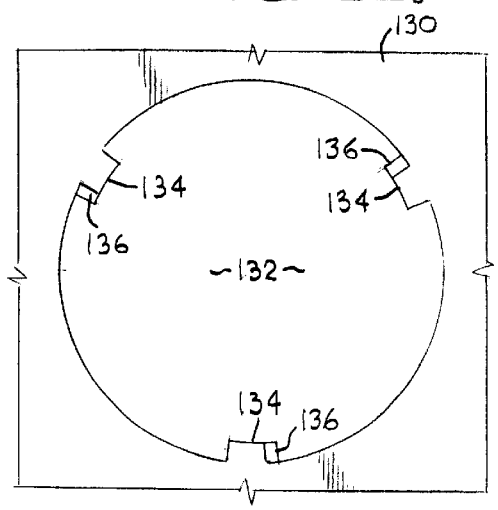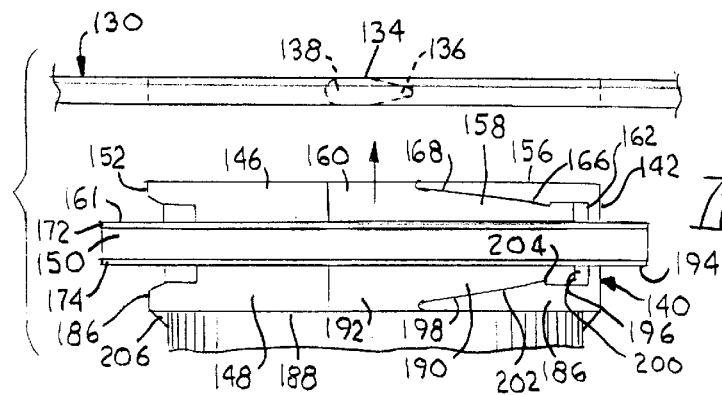

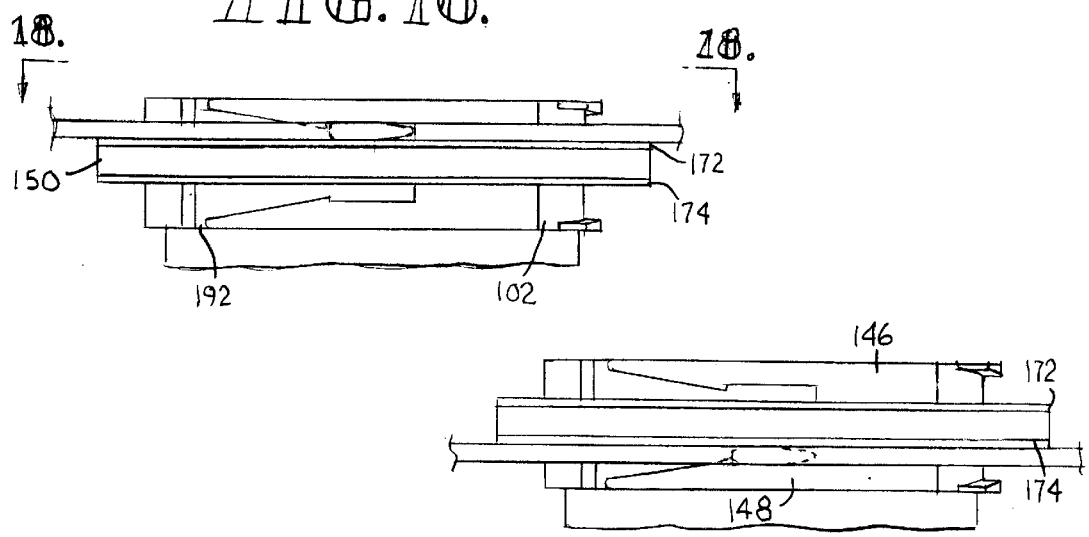
FIG. 16.
FIG. 17.
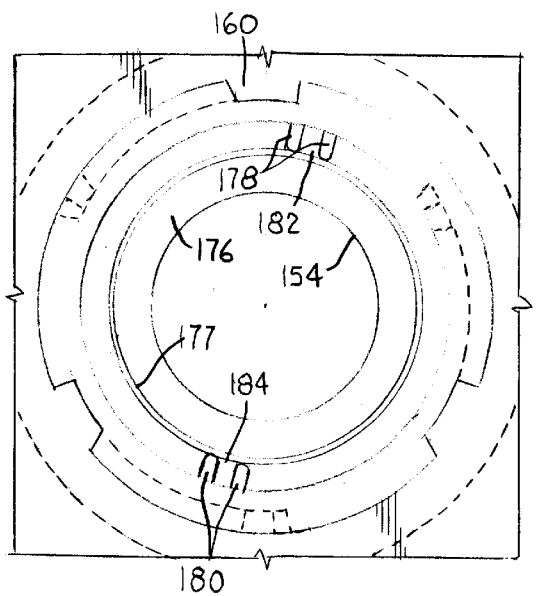
FIG. 18.
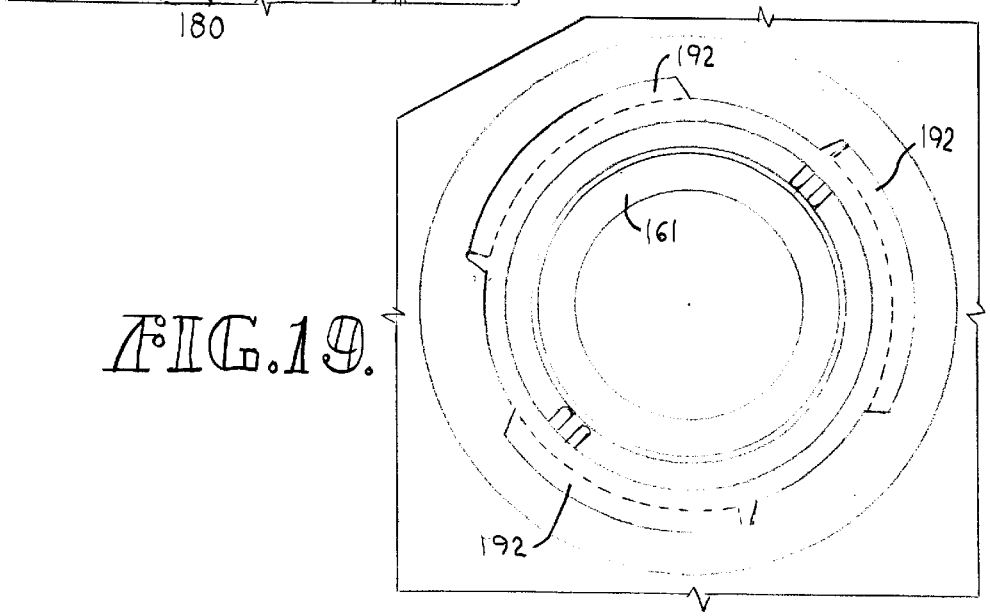
FIG. 19.

AIR FILTER ASSEMBLY CAPABLE OF TOP AND BOTTOM LOADING

CROSS-REFERENCE TO RELATED APPLICATIONS

Pursuant to 35 U.S.C. §119(e), priority benefits are claimed herein from co-pending provisional application Serial No. 60/216,717, filed on Jul. 7, 2000, entitled "Air Filter Assembly Capable of Top and Bottom Loading".

BACKGROUND OF THE INVENTION

The present invention generally relates to filters within a baghouse and more particularly to an air filter capable of being mounted from either the top or the bottom of the tubesheet.

Filter assemblies are commonly used for removing particulates and aerosols from the air in industrial environments. One type of common filter assembly is an industrial baghouse. Baghouses typically include two large chambers, or plenums, that are divided by a tube sheet. The filter cartridges, preferably containing fabric filtration elements, are secured to the tube sheet at one end to suspend the cartridge in the lower plenum. Fabric filter media having longitudinal pleatings are particularly effective for removing particulates. One such air filter cartridge is disclosed in U.S. Pat. No. 5,632,791 to Reinout G. Oussoren and Jack T. Clements, herein incorporated by reference in its entirety.

Air containing unwanted particulates is forced into the first plenum by a forced air means such as a fan. The air passes from the first plenum to the second plenum via the air filter cartridges held by the tube (or pan) sheet. The particulates are retained on the outer surface of the fabric filter element of the cartridge filter, and the clean air is directed into the second plenum and exits the baghouse through an exhaust passageway.

To suspend the cartridges from the tube sheet, the cartridges are either loaded from the upper or lower plenum. Specifically, to load the cartridges from the upper plenum or "top load" the cartridges, the cartridge is slidingly received within the appropriate opening and the top cap of the cartridge is frictionally secured to the tubesheet at one of the openings. To load from the lower plenum or "bottom load" the cartridge, the cartridge is raised into proximity with the tubesheet and the top cap of the cartridge is attached to the tubesheet at one of the openings. The decision to top or bottom load the cartridge is often dictated by the accessibility and size of the plenums. If the upper plenum is spacious, a worker may move within the upper plenum to load the cartridges by top loading. Conversely, if the lower plenum is more accessible and provides the necessary space, the cartridges are typically bottom loaded.

However, in the past, air filter cartridges are designed for either top or bottom loading, but not both. Accordingly, the operator of the baghouse must have the appropriate type of either bottom load or top load cartridges for the particular baghouse. In industrial environments having both top and bottom load baghouses, an inventory of filter cartridges must be maintained for each baghouse. Accordingly, there is a need for an air filter cartridge capable of top and bottom loading within a baghouse.

BRIEF SUMMARY OF THE INVENTION

It is an object of the present invention to provide an air filter cartridge capable of top and bottom loading within a filter assembly. In accordance with the foregoing and other objects evident from the following description of a preferred embodiment of the invention, a baghouse filter having a filter media and an end cap is provided. The filter media has a longitudinal axis, and the end cap has an outer peripheral side wall. The side wall has first and second edges. A first recessed channel extends between the first and second edges of the side wall, and a second recessed channel extends from the first channel. The first and second channels define a connection area at which the filter connects to the tubesheet at an opening in the tubesheet.

In accordance with another aspect of the invention, the filter has a filter media and an end cap. The end cap has first and second connector portions. The first connector portion mates with the tubesheet at a tubesheet opening when the filter is installed from the bottom plenum. The second connector portion mates with the tubesheet at a tubesheet opening when the filter is installed from the bottom plenum.

In yet another aspect of the invention, a tubesheet is provided having a planar sheet, a number of openings in the sheet and a number of collars. Each collar is positioned about an opening in the sheet and extends normally from the sheet. Each collar has an inner face directed toward the center of the opening about which the collar is positioned. The collars include a number of elements extending radially from the inner face toward the center of the opening.

In still another aspect of the invention, a method is provided for installing a filter on a tubesheet having first and second sides separating plenums of a baghouse. The method includes providing a filter having structure for attaching to a tubesheet opening from either side, selecting the side to install the filter and installing the filter on the selected side.

In another aspect of the invention, a tool for securing a filter cartridge to or from a tubesheet is provided. The tool has an elongated shaft, a handle, a disc and a rod. The handle is positioned at a first end of the shaft. The disc is disposed on the other end of the shaft and is aligned normally with respect to the shaft. The rod is coupled with the disc and has opposing ends extending beyond the periphery of the disc.

BRIEF DESCRIPTION OF SEVERAL VIEWS OF THE DRAWINGS

The following description of the drawings, in which like reference numerals are employed to indicate like parts in various views:

FIG. 11 is an exploded elevational view of the air filter cartridge of FIGS. 5 and 6 and an alternative connection device with parts broken away for ease of illustration;

FIG. 12 is an enlarged sectional view of the filter cartridge locked onto the alternative connection device of FIG. 11;

FIG. 13 is an enlarged sectional view of the air filter cartridge locked onto a second alternative connection device;

FIG. 14 is a fragmentary top plan view of a tube sheet of the air filter assembly having a plurality of notches to engage the air filter cartridge;

FIG. 15 is an exploded partial elevational view of an air filter cartridge of a second embodiment of the present invention, wherein the filter cartridge is shown as being bottom loaded on the tube sheet of FIG. 14;

FIG. 16 is a fragmentary elevational view demonstrating the air filter cartridge of the second embodiment in the bottom-loaded, locked position;

FIG. 17 is a fragmentary side elevational view demonstrating the air filter cartridge of the second embodiment in the top loaded, locked position;

FIG. 18 is a plan view taken along lines 18—18 of FIG. 16;

FIG. 19 illustrates, by plan view, a modification to the second embodiment of the air filter cartridge used in conjunction with the tube sheet of FIG. 14.

DETAILED DESCRIPTION OF THE INVENTION

Figure 1:
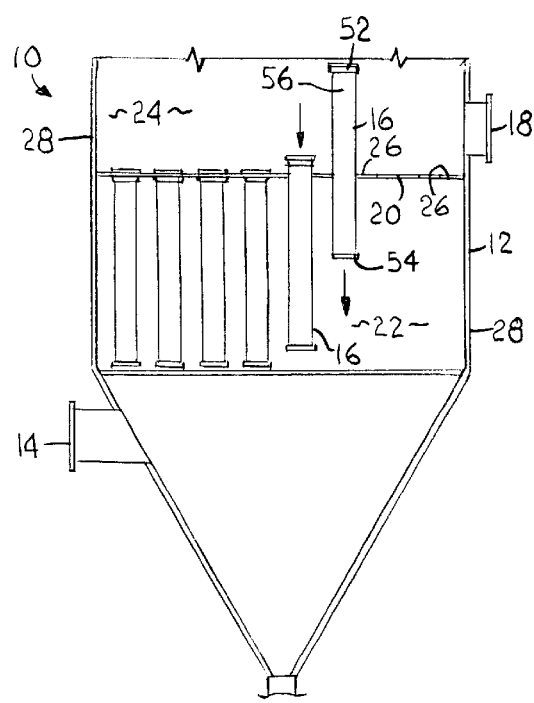
FIG. 1 is a schematic view of the interior of a filter assembly demonstrating top loading of an air filter cartridge.

With initial reference to FIG. 1, a baghouse, utilizing filter cartridges made in accordance with the present invention is designated generally by the reference numeral 10. Baghouse 10 is defined by an enclosed housing 12 made from a suitable material such as sheet metal. Gas flows through the baghouse 10 from an inlet 14. Gas is filtered by a plurality of filter cartridges 16 and exits the baghouse 10 through an outlet 18. The filter cartridges 16 are secured to a tubesheet 20, thus defining a lower plenum 22 and an upper plenum 24. Specifically, each air filter cartridge 16 is secured within the tubesheet 20 at one of a plurality of openings 26 formed within the tube sheet 20.

Figure 2:
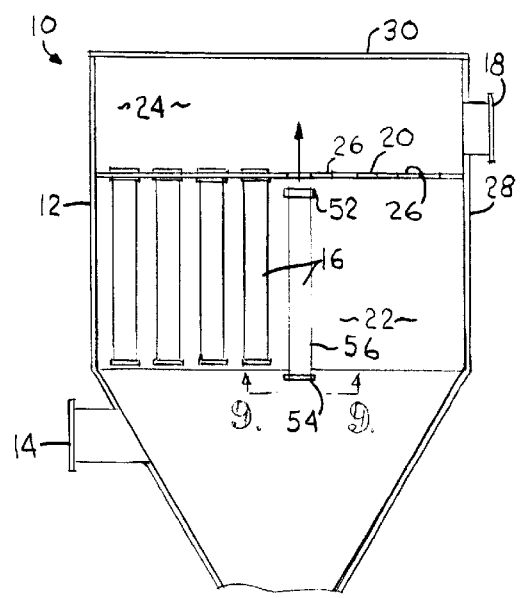
FIG. 2 is a schematic view of the interior of a filter assembly demonstrating bottom loading of an air filter cartridge.

The housing 12 of the baghouse 10 includes a number of sides 28 and a roof 30. As shown in FIG. 1, some baghouses have larger or more accessible upper plenums 24 allowing for the filter cartridges 16 to be loaded from the top of the tubesheet 20 and secured within the appropriate opening 26. For instance, the height of the upper plenum 24 may allow for a worker to move within the plenum 24, or the roof 30 may be removable to allow access into the baghouse 10 for top loading. As shown in FIG. 2, in some baghouses, the upper plenum 24 does not have a sufficient height to allow for top loading and thus the filter cartridges 16 are loaded from the lower plenum 22.

Figure 3:
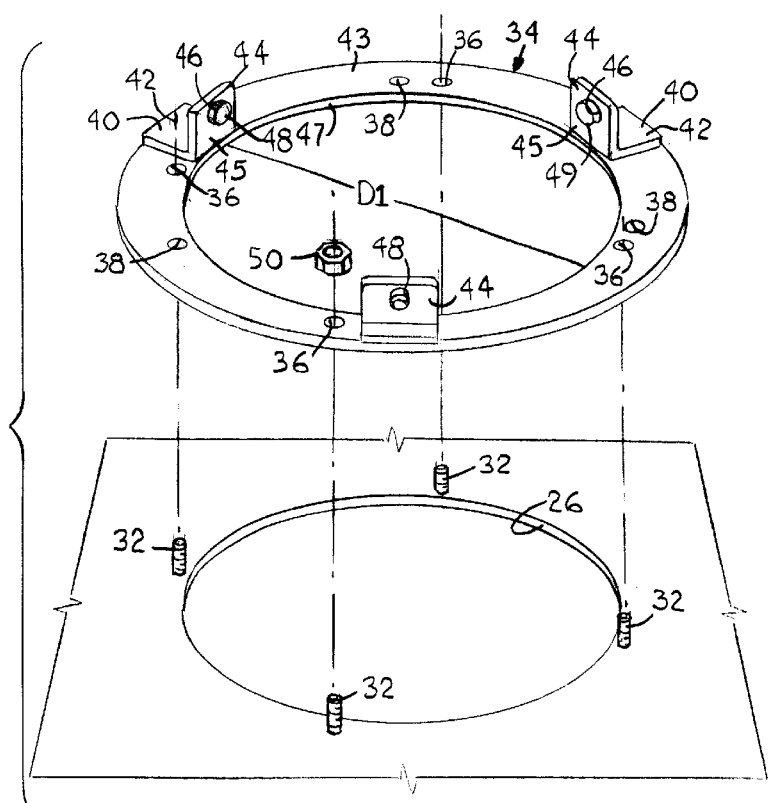
FIG. 3 is an exploded perspective view of an adaptor plate and tube sheet according to the present invention.

With reference to FIG. 3, an opening 26 of tubesheet 20 is illustrated. In some prior art connection devices, a number of bolts 32 are placed around the periphery of the circular opening 26. Typically, the bolts 32 are angularly equidistant from one another. For instance as shown in FIG. 3, each bolt is offset by 90° from the next adjacent bolt. Another conventional design consists of three bolts offset one from another by 120°. In accordance with the principles of the present invention, an adaptor plate 34 is placed over the existing bolts 32. Annular adaptor plate 34 has a first set of apertures 36 and a second set of apertures 38. The first set of apertures 36 are spaced 90° one from another to correspond with the bolts 32 on the tubesheet 20. The second set of apertures 38 are spaced 120° one from another to correspond with a tubesheet having three (rather than four) bolts. Of course, the bolts and apertures may be spaced in an asymmetrical pattern about the end cap.

Figures 4, 5:
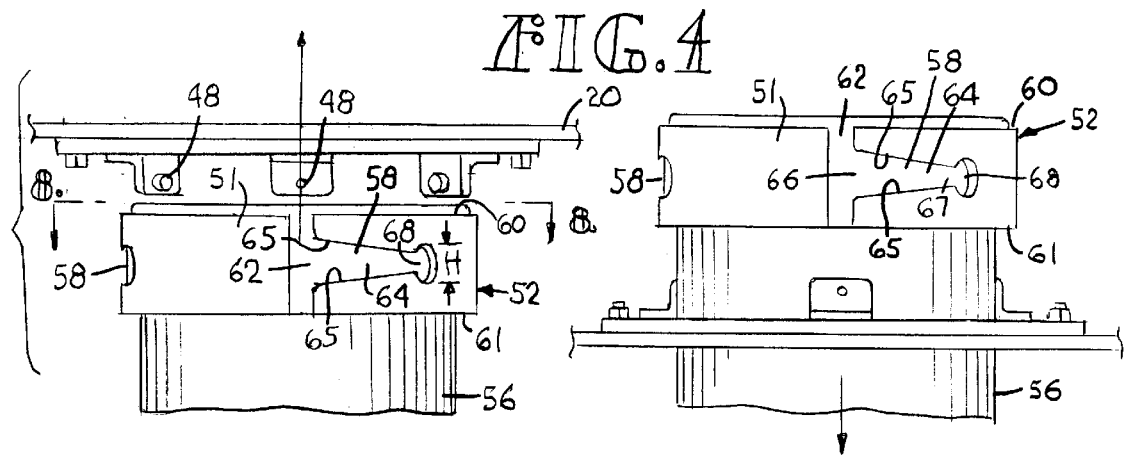
FIG. 4 is a fragmentary, exploded elevational view of an air filter cartridge of the present invention being bottom loaded with the filter assembly.
FIG. 5 is a fragmentary, elevational view of the air filter cartridge of FIG. 4 being top loaded within the filter assembly.

The adaptor plate 34 further comprises a number of L-brackets 40 spaced around the top surface of adaptor plate 34. In the preferred embodiment, three L-brackets 40 are placed equally around the adaptor plate 34. Both the adaptor plate 34 and L-brackets 40 are preferably made from a suitable material such as sheet metal. Each L-bracket 40 has a lower portion 42 secured to the adaptor plate 34 and an upstanding portion 44 extending normally from the surface 43 of adaptor plate 34. Each upstanding portion 44 has an inner face 45 that is flush with the periphery of the inner peripheral edge 47 to define a diameter D1 of the adaptor plate 34. A threaded aperture 46 is located within the upstanding portion 44 of each L-bracket 40. Bolts 48 having generally round heads 49 are threaded within each aperture 46 and extend radially inwardly toward the center of the adaptor plate 34. With reference to FIGS. 3 and 4, the adaptor plate 34 is placed on the tubesheet 20 so that the bolts 32 are received within the first set of apertures 38. When the adaptor plate 34 is in contact with tubesheet 20, nuts 50 are secure on bolts 32 and the adaptor plate 34 is held against the tubesheet 20.

Figure 7:
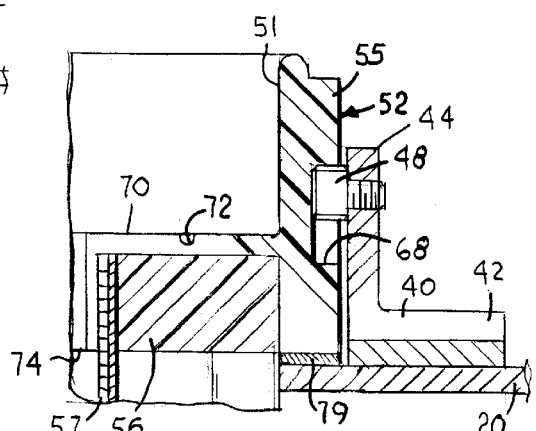
FIG. 7 is an enlarged fragmentary sectional view of the air filter assembly taken along line 7—7 of FIG. 6.

With reference to FIGS. 1 and 2, the filter cartridges 16 include a first (top) end cap 52, a second (bottom) end cap 54 and a tubular filter media 56 disposed therebetween. As air is cleaned, it passes through the tubular filter media 56 and moves upwardly through a channel defined by the filter media 56 and into the upper plenum 24. With reference to FIG. 4, the top end cap 52 is formed about the filter media 56 as would be understand by one of ordinary skill in the art. With reference to FIG. 7, the top end cap 52 is typically formed from a potting material 55. The potting material 55 extends about the upper edge of tubular filter media 56 and a screen member 57 as known to those of ordinary skill in the art.

Figure 8:
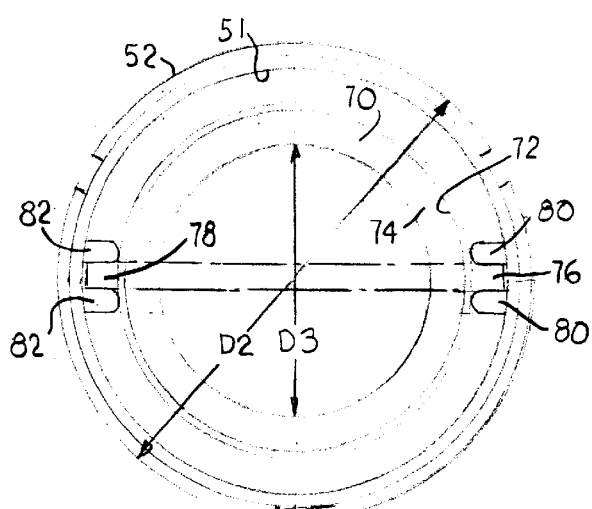
FIG. 8 is a top plan view of the air filter cartridge taken along lines 8—8 of FIG. 4.

With reference to FIGS. 4 and 8, top end cap 52 is generally annular and has an outer diameter D2 that is slightly smaller than the diameter of the openings 26 of the tubesheet 20 and the diameter D1 of the opening defined by adaptor plate 34. The inner diameter D3 (FIG. 8) of the top end cap 52 is generally equal in size to the diameter of the air flow channel defined by tubular filter media 56 so that the top end cap 52 does not obstruct the flow therethrough.

As best shown in FIG. 4, in the peripheral sidewall 51 of top end cap 52, a plurality of connection areas 58 are defined between the upper edge 60 and lower edge 61 of the top end cap 52. In the preferred embodiment, each of the three connection areas 58 has a longitudinal channel 62 and a locking channel 64. The longitudinal channel 62 runs parallel to the longitudinal axis of the tubular filter media 56 and has a uniform depth within the top end cap 52. The locking channel 64 extends generally normal to the longitudinal channel 62 and has the same depth as the longitudinal channel. The sidewalls 65 of the locking channel 64 are tapered inwardly and terminate at the mouth 67 of a locking area 68. The height H of the locking area is preferably greater than the smallest distance (namely, that distance at mouth 67) between the sidewalls of the tapered locking channel 64.

With reference to FIGS. 7 and 8, the top end cap 52 defines an annular ledge 70 which extends inwardly from the sidewall 51 about the interior of the potting material 55 proximate the collar 53. The annular ledge 70 extends completely about the top end cap 52, and a groove 72 is disposed completely around the ledge 70. A pair of opposing notches 76 and 78 are defined by a first pair of upstanding members 80 and a second pair of upstanding members 82, respectively. The notches 76 and 78 are aligned linearly with one another.

Figure 6:
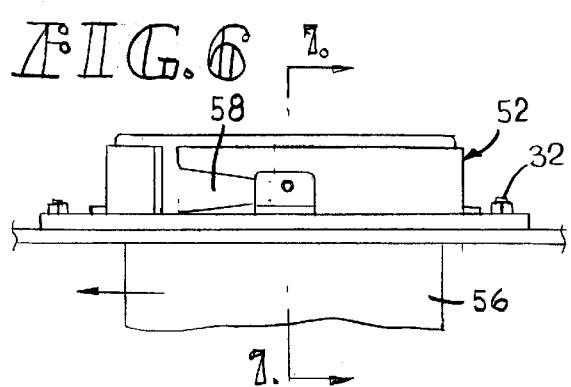
FIG. 6 is a fragmentary, elevational view of the filter cartridge locked onto the adaptor plate of FIG. 3.

As best shown in FIG. 1, the filter cartridge 16 of the present invention is capable of being top loaded from the upper plenum 24 of the baghouse 10. With specific reference to FIG. 5, the tubular filter media 56 is slidingly received within the opening defined by the inner peripheral edge 47 of the adaptor plate 34 and one of the openings 26 of tubesheet 20. An annular gasket 79 (or engaging surface) is located around top end cap 52 at the area of the top end cap 52 contacting tubesheet 20. The bolts 48 of adaptor plate 34 are received within the longitudinal channels 62 of each of the connection areas 58 of top end cap 52. When the filter cartridge 16 is lowered to the depth at which the bolts 48 are proximate the mouth portions 66 of locking channels 64, the filter cartridge 16 is rotated in the clockwise direction indicated by the arrow in FIG. 6. The bolts 48 are received within the locking channels 64 at the locking areas 68 when the rotation is complete. With specific reference to FIG. 7, each bolt 48 contacts the upper surface of its corresponding locking area 68 and the filter is suspended therefrom.

Likewise, with reference to FIG. 4, the filter cartridge 16 may be bottom loaded when the adaptor plate 34 is secured to the tubesheet 20 on the lower plenum side of the tubesheet 20. Specifically, the top end cap 52 is placed in proximity with the adaptor plate 34 and the heads of the bolts 48 are aligned with the longitudinal channels 62 of the connection areas 58. Finally, the filter cartridge 16 is inserted within the connection areas and rotated so that the bolts 48 are positioned within the locking areas 68. At this point, an annular gasket 69 contacts the tubesheet 20 to form a seal.

Figure 10:
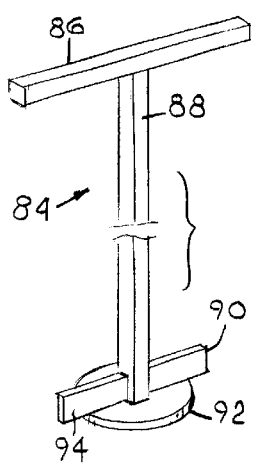
FIG. 10 is a perspective view of a tool used in accordance with the present invention.

As shown in FIG. 10, a tool 84 may be used to facilitate rotation of the filter cartridge 16 to and from the locked position of FIG. 7. Tool 84 includes a handle 86, a shaft 88 and a cartridge engagement assembly 90. The handle 86 and shaft 88 are preferably made from a square tube of metal such as steel and are welded together. The cartridge engagement assembly 90 includes a disc 92 and a rod 94. The disc 92 is preferably welded to the end of the shaft 88 opposite handle 86. The rod 94 is welded to either side of the shaft 88 and to the upper surface of disc 92. The disc 92 is sized to fit onto the ledge 70. As shown by the phantom lines in FIG. 8, the rod 94 is received within notches 76 and 78 when the disc 92 is properly seated. The user merely grasps the handle 86 and rotates the tool 84 to rotate the cartridge relative to the tubesheet 20.

Figure 9:
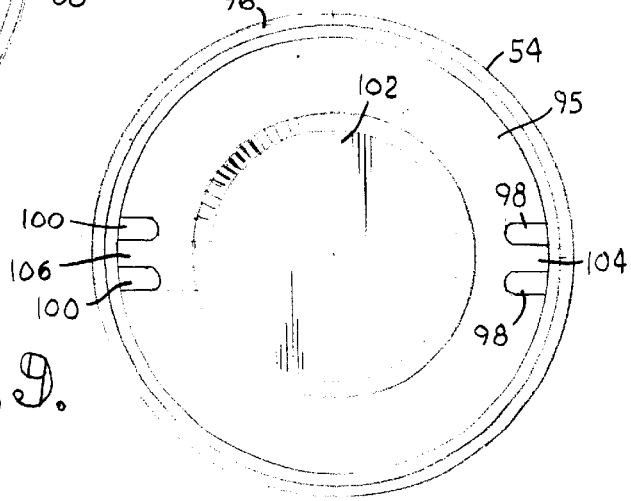
FIG. 9 is a bottom plan view of the air filter cartridge taken along lines 9—9 of FIG. 2.

With reference to FIG. 9, the potting material 96 of the bottom end cap 54 is recessed to present a ledge 95. A pair of upstanding members 98 and 100, similar to upstanding members 80 and 82 of the top end cap 52, are located on the ledge 95 and define notches 104 and 106, respectively. A circular depression 102 is formed centrally on the bottom end cap 54. In order to bottom load (or unload) the filter cartridges 16 from the tubesheet 20, the disc 92 is placed within depression 102 and the rod 94 within the notches 104 and 106 prior to rotation of the filter cartridge 16. Typically, the space between the bottom end cap 54 and housing 12 is limited and a tool 84 having a relatively short shaft 88 is desired.

While one embodiment of the filter cartridge 16 consists of the longitudinal channel 62 and the locking channel 64, the connection areas may take on any of a number of configurations allowing for top and bottom loading. For instance, a pair of channels may originate from upper edge 60 and lower edge 61 and be formed angularly with respect to one another. The top end cap 52 could be threaded onto the tube sheet at either of the two channels and locked at the intersection of the channels.

With reference to FIGS. 11 and 12, an alternative structure for connecting a filter cartridge 16 to a tubesheet 20 is illustrated. A collar 110 extends downwardly from tubesheet 20 into the lower plenum 22 of the baghouse 10. Each collar 110 is preferably formed from the same material as the tubesheet 20 and is welded thereto. A plurality of bolts 112 corresponding to the number of connection areas 58 of the filter cartridge 16 are threaded within apertures 114 located around the collar 110. A resilient gasket 116 in the shape of a ring is adhered to the underside of the planar portion of the tubesheet 108 around the opening 26 of the tube sheet. To bottom load the filter cartridge 16, the top end cap 52 is placed within the collar 110 so that bolts 112 are received within the longitudinal channels 62. Once the end cap 52 contacts resilient gasket 116, the filter cartridge 16 is rotated relative to the collar 110 similarly to the rotation with respect to the adaptor plate 34 (described above). The gasket 116 forms a generally air-tight seal between the filter cartridge 16 and tubesheet 20.

With reference to FIG. 13, a collar 120, which is a variation of collar 110, is shown. A plurality of bolts 122 corresponding to the number of connection areas 58 that are threaded within apertures 124 are formed within the collar 120. However, a small annular ledge 126 is located about the terminal edge of collar 120. A resilient gasket 128 is located on the upper surface of ledge 126. The tubesheet 20, having collar 120 thereon, is used for top loading the filter cartridge 16. Specifically, the bottom end cap 54 and tubular filter media 56 are placed downwardly into the lower plenum 22 through the collar 120. When the top end cap 52 is in proximity with the bolts 122, the bolts 122 are aligned relative to the longitudinal channels 62 and the top end cap 52 is slid into a resting position on small ledge 126. The filter cartridge 16 is rotated so that the bolts 122 are moved to the locked position, the filter cartridge 16 is lifted slightly from small ledge 126. The resilient gasket 128 forms a generally air-tight seal between the filter cartridge 16 and tubesheet 118.

FIG. 14 illustrates a tubesheet 130 for use in conjunction with an alternative air filter cartridge shown in FIGS. 15–18. Tubesheet 130 includes a plurality of openings 132. Around the periphery of opening 132, a plurality of tabs 134 extend inwardly toward the center of each opening. With reference to FIG. 15, the tabs 134 have a beveled edge 136 on a first side of each tab 134, and a body 138 having a width generally equal to the planar portion of the tubesheet 130. The tabs 136 are preferably spaced angularly equidistant from one another. Accordingly, the three tabs 134 of the preferred embodiment are offset by 120° from each adjacent tab 134. Alternatively, the tubesheet 130 may have varying numbers of tabs.

With reference to FIGS. 15–18, an alternative filter cartridge is designated generally by the numeral 140. The filter cartridge 140 is similar to filter cartridge 16 except for the construction of the top end cap 142 formed about a first end of the tubular filter media 144. With specific reference to FIG. 15, the top end cap 142 includes a first connector portion 146, a second connector portion 148 and an annular flange 150 disposed therebetween.

With reference to FIGS. 15 and 18, the first connector portion 146 has a first outer sidewall portion 152, a first inner sidewall portion 154 and a top edge 156. A plurality of recessed channels 158 defining threads are formed within first outer sidewall portion 152 of first connector portion 146. A plurality of channel openings 160 extends longitudinally from the top edge 156 of the first connector portion 146 and each channel opening 160 is in communication with a corresponding recessed channel 158. The recessed channels 158 are defined by the upper surface 161 of annular flange 150, an end wall 162, and an edge wall 164. The edge wall 164 has a first portion 166, extending from end wall 162, that is parallel with the upper surface 161 of annular flange 150 and a second portion 168 extending between first portion 166 and opening 160 that tapers away from the upper surface 161 of flange 150. In the preferred embodiment, a ridge 170 is defined at the intersection of first portion 166 and second portion 168. The depth within the outer sidewall 152 of each recessed channel 158 is slightly greater than the length that each tab 134 extends inwardly from the corresponding opening 132 of the tubesheet 130.

The annular flange 150 has an outer diameter greater than the diameter of opening 132. A first annular gasket 172 is located on the surface of flange 150 directed toward the first connector portion 146, and a second annular gasket 174 is located on the surface of flange 150 directed toward the second connector portion 148. The gaskets 172 and 174 are preferably made from a resilient material that may be adhered or otherwise secured to the annular flange 150. With specific reference to FIG. 18, the annular flange 150 has an inner diameter and presents a ledge 176 around the opening of top end cap 142. A groove 177 is formed near a midpoint of ledge 176. Two pairs of upstanding members 178 and 180 are located on the ledge 176 to define opposing notches 182 and 184. The ledge 176 and notches 182 and 184 are used in conjunction with the tool 84 (FIG. 10) as described above.

With reference back to FIG. 15, the second connector portion 148 is generally similar to the first connector portion 146. Namely, second connector portion 148 has a second outer sidewall portion 186 and a bottom edge 188. The inner portion of the second connector portion is formed about the tubular filter media 144 as is known to those of ordinary skill in the art. A plurality of recessed channels 190, each channel defining a thread are formed within second outer sidewall portion 186 of second connector portion 148. A plurality of openings 192 extend longitudinally from the bottom edge 188 into communication with each recessed channel 190. Recessed channels 190 are defined by a lower surface 194 of annular flange 150, an end wall 196, and an edge wall 198. The edge wall 198 has a first portion 200 extending from the end wall 196 and disposed parallel with the lower surface 194. A second portion 202 extends between first portion 200 and opening 192 and tapers away from flange 150. In the preferred embodiment, a ridge 204 is defined at the intersection of first portion 200 and second portion 202. Additionally, the second connector portion 148 includes a tapered skirt 206 extending from the outer sidewall section 186 and around the tubular filter media 144. The depth of each recessed channel 190 is the same as the depth of the recessed channels 158 of the first connector portion.

With reference to FIG. 15, to bottom load the filter cartridge 140 to the tubesheet 130, the openings 160 are placed in alignment which each of the tabs 134. When the tabs are placed within openings 160 and are in close proximity with the upper surface 161 of annular flange 150, the filter cartridge 140 is rotated in the direction indicated by the arrow in FIG. 16 so that the beveled edge 136 moves within the recessed channel 158 between annular flange 150 and the second portion 168 of edge wall 164. As the filter cartridge 140 is further rotated, each tab 134 slides between the second portion 168 of edge wall 164 and the annular flange 150. When the rotation is complete, each tab 134 is seated between an end wall 162 and the small ridge 170 at the intersection of first portion 166 and second portion 168 of edge wall 164. In this position, the first annular gasket 172 is in connection with the bottom of tubesheet 130 to form a seal therebetween. The bottom of filter cartridge 140 may be similar to the bottom end cap of filter cartridge 160 as shown in FIG. 9. Thus, the tool 84 (FIG. 10) may be used to either secure or remove the filter cartridge 140 from the tubesheet 130 when bottom loading (or unloading).

With reference to FIG. 17, the filter cartridge 140 may be top loaded within the baghouse 10 use of second connector portion 148. Specifically, the tubular filter media 144 of filter cartridge 140 is placed through one of the openings 132 of tubesheet 130. When the top end cap 142 is in proximity with the tubesheet 130, the tabs 134 are aligned with the channel openings 192 of second connector portion 148. The tabs are received within the openings 192 so that the tabs are in communication with the bottom lower surface 194 of annular flange 150. At this point, the filter cartridge 140 is rotated in the direction indicated by the arrow in FIG. 17 so that the tab is positioned within the portion of the recessed channel 190 between the edge wall 198 and the lower surface 194 of annular flange 150. As indicated in phantom lines in FIG. 17, when rotation of the filter cartridge 140 is complete, each tab 134 is positioned between the first portion 200 of edge wall 198 and the lower surface 194 of annular flange 150 between the end wall 196 and the ridge 204. When the filter cartridge 140 is in the top loaded position, the second annular gasket 174 is in communication with the upper surface of tubesheet 130 to form a seal therebetween. To facilitate the unloading and loading of the filter cartridges 140 from the upper plenum 24, the tool 84 (FIG. 10) may be placed on ledge 176 and the rod 94 placed within notches 182 and 184.

FIG. 19 demonstrates an alternative embodiment of the filter cartridge 140 wherein the channel openings 192 are significantly larger than the channel openings 160 to facilitate the receipt of larger tabs located about the openings 132 of the tubesheet 130. This is merely illustrative of one of a number of variations of the inventive construction described above.

From the foregoing it will be seen that this invention is one well adapted to attain all ends and objects hereinabove set forth together with the other advantages which are obvious and which are inherent to the structure. It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative of applications of the principles of this invention, and not in a limiting sense.

What is claimed is:

1. A filter for use in a baghouse, said baghouse divided into top and bottom plenums by a tubesheet, said tubesheet having a plurality of openings therein, said filter for attachment to said tubesheet at one of said openings, said filter comprising:

a filter media; and an end cap having first and second connector portions, wherein said first connector portion mates with the tubesheet at one of the openings when said filter is installed from the bottom plenum, wherein said second connector portion mates with the tubesheet at one of the openings when said filter is installed from the top plenum, and wherein each said connector portion comprises at least one thread.

2. The filter of claim 1, wherein each said connector portion comprises a plurality of threads.

3. The filter of claim 2, wherein said connector portions are divided by an annular flange.

4. The filter of claim 3, wherein said end cap has a first side wall portion at a first side of said annular flange and a second side wall portion at a second side of said annular flange, wherein said threads of said first connector are located in said first side wall portion and said threads of said second connector are located in said second side wall portion.

5. The filter of claim 4, wherein each said thread comprises a channel.

6. The filter of claim 5, wherein each said channel is defined by an edge wall, an end wall, and said annular flange.

7. The filter of claim 6, wherein at least a portion of said edge wall is tapered relative to said annular flange.

8. The filter of claim 7, wherein a portion of said edge wall is parallel to said annular flange.

9. The filter of claim 8, wherein a portion of each said channel defined by said tapered edge wall portion and said annular flange communicates with an opening to an edge of said end cap.

10. The filter of claim 9, wherein said tapered portion transitions to said portion of said edge wall parallel to said flange, and a ridge is located at the intersection of said tapered portion and said portion of said edge wall parallel to said flange.

11. The filter of claim 10, in combination with said baghouse, wherein each said opening is defined by a periphery having a plurality of tabs extending inwardly toward the center of the opening, wherein each said tab is received within a corresponding one of said threads such that each said tab is positioned against the end wall of said corresponding threads, and wherein said filter is at least partially restrained from rotation in a direction opposite the direction of installation by said ridge.

12. A filter for use in a baghouse, said baghouse divided into top and bottom plenums by a tubesheet, said tubesheet having a plurality of openings therein, said filter for attachment to said tubesheet at one of said openings, said filter comprising:

a filter media;

an end cap having first and second connector portions, wherein said first connector portion mates with the tubesheet at one of the openings when said filter is installed from the bottom plenum, and wherein said second connector portion mates with the tubesheet at one of the openings when said filter is installed from the top plenum;

annular flange dividing said first connector portion and said second connector portion, said annular flange having a first face and a second face;

a first gasket positioned on said first face of said annular flange; and a second gasket positioned on said second face of said annular flange, wherein said first face of said annular flange is sealingly engaged with a bottom of said tubesheet when said filter is installed on said tubesheet from the bottom of said tubesheet, and wherein said second face of said annular flange is sealingly engaged with the top of said tubesheet when said filter is installed on said tubesheet from the top of said tubesheet.

13. The filter of claim 1, wherein said end cap has a lower portion that depends downwardly and inwardly, whereby said downwardly and inwardly depending portion of said end cap guides the filter through one of said openings when said filter is installed on said tubesheet from a top of said tubesheet.

14. The filter of claim 1, said end cap having a pair of notches for receiving a tool used to install and remove said filter.

* * * * *